United States Patent
Hamagaki

(10) Patent No.: US 6,999,085 B2
(45) Date of Patent: Feb. 14, 2006

(54) CONSECUTIVE READING METHOD FOR A COMPUTER GAME

(75) Inventor: Hiroshi Hamagaki, Tokyo (JP)

(73) Assignee: Genki Co., Ltd., Tokyo (JP)

(*) Notice: Subject to any disclaimer, the term of this patent is extended or adjusted under 35 U.S.C. 154(b) by 413 days.

(21) Appl. No.: 09/837,333

(22) Filed: Apr. 19, 2001

(65) Prior Publication Data

US 2002/0086735 A1    Jul. 4, 2002

(30) Foreign Application Priority Data

Dec. 28, 2000 (JP) ............................. 2000-402486

(51) Int. Cl.
*G09G 5/39* (2006.01)
(52) U.S. Cl. .......................... 345/531; 463/43
(58) Field of Classification Search ................ 345/501, 345/531, 530, 581; 463/43, 30, 31, 32
See application file for complete search history.

(56) References Cited

U.S. PATENT DOCUMENTS

| | | | | |
|---|---|---|---|---|
| 5,577,960 A | * | 11/1996 | Sasaki | 463/32 |
| 5,793,376 A | * | 8/1998 | Tanaka et al. | 345/582 |
| 6,268,869 B1 | * | 7/2001 | Ugajin et al. | 345/581 |
| 6,449,687 B1 | * | 9/2002 | Moriya | 711/112 |

FOREIGN PATENT DOCUMENTS

| | | | |
|---|---|---|---|
| JP | 07085312 | * | 3/1995 |
| JP | 09050541 | * | 2/1997 |
| JP | 09167256 | * | 6/1997 |
| JP | 09299613 | * | 11/1997 |
| JP | 11042370 | * | 2/1999 |
| JP | 2000024313 | * | 1/2000 |

* cited by examiner

*Primary Examiner*—Kee M. Tung
(74) *Attorney, Agent, or Firm*—Lowe Hauptman & Berner, LLP

(57) ABSTRACT

A consecutive reading method for a computer game comprising the steps of reading as a plurality of segments field data to be resident in memory and displayed on a monitor screen and deleting field data in segments resident in memory and reading new field data into memory based on the player's progress in the game.

10 Claims, 3 Drawing Sheets

CONSECUTIVE READING METHOD FOR A COMPUTER GAME

BACKGROUND OF THE INVENTION

1. Field of the Invention

The present invention relates to a consecutive reading method for a computer game that displays scenes of the game on the computer screen and reads data related to the game into resident memory from a storage device.

2. Description of the Related Art

Conventional car race games and similar computer programs use graphical data within a volume range that can be stored in the computer's own memory in order to avoid the need to read data during the game play. Reading data during the race in a conventional race game often results in the screen freezing temporarily. In order to avoid such stoppage in game play, game manufacturers design courses that use the same graphical data at a plurality of points during the race in order to create lengthy racecourses while avoiding the need to read data during the race.

When using the same graphical data for multiple points of the racecourse, however, the game graphics become monotonous with the same bridges, road surfaces, curves, and signs, for example, appearing at multiple locations along the racecourse. However, if such data is not used repeatedly, data that does not need to be displayed is left resident in memory, limiting the game to a short racecourse or lower quality graphics.

SUMMARY OF THE INVENTION

In view of the foregoing, it is an object of the present invention to provide a consecutive reading method for a computer game capable of continuously displaying images of high quality and providing new displays constantly without reusing graphical data. It is another object of the present invention to provide a storage medium employing this consecutive reading method.

These objects and others will be attained by a consecutive reading method for a computer game for reading field data from a storage device into a memory in a computer, the method comprising the steps of reading as a plurality of segments the field data to be resident in memory and displayed on a monitor screen; and deleting field data in segments resident in memory and reading new field data into memory based on the player's progress in the game.

According to another aspect of the present invention, the field data comprises graphics data to be displayed on the monitor screen; and texture data accompanying the graphics data. Further, the field data is divided into units of a maximum size that can be read in one random access. Further, the segments comprise sector units equivalent to the smallest unit that can be read from the storage device.

According to another aspect of the present invention, the consecutive reading method further comprises the step of determining whether or not to display the field data by referencing a table stored in memory. The table includes such data as the model number corresponding to the graphics region, the starting position of the sector in memory, the sector length, the center position of the graphics model, and the radius of the graphics model.

According to another aspect of the present invention, the consecutive reading method further comprises the steps of predetermining a number of buffers for storing field data; sorting field data to be displayed in the player's field of view in order from the point of observation; and discarding requests for displaying field data when the number of field data exceed the number of buffers.

According to another aspect of the present invention, a recording medium stores computer programs using the above-described consecutive reading method and data read by the computer programs.

DESCRIPTION OF THE PREFERRED EMBODIMENTS

A consecutive reading method for a computer game according to a preferred embodiment of the present invention will be described while referring to the accompanying drawings.

In the computer game of the present embodiment, data related to the game and a program for executing the game have been written to a compact disc (CD-ROM) or similar storage medium. The executable program is read into a game console or other computer device and executed while a display of the game graphics is shown on the monitor screen (not shown). In the following description, a car racing game is used as an example.

Figure 1:
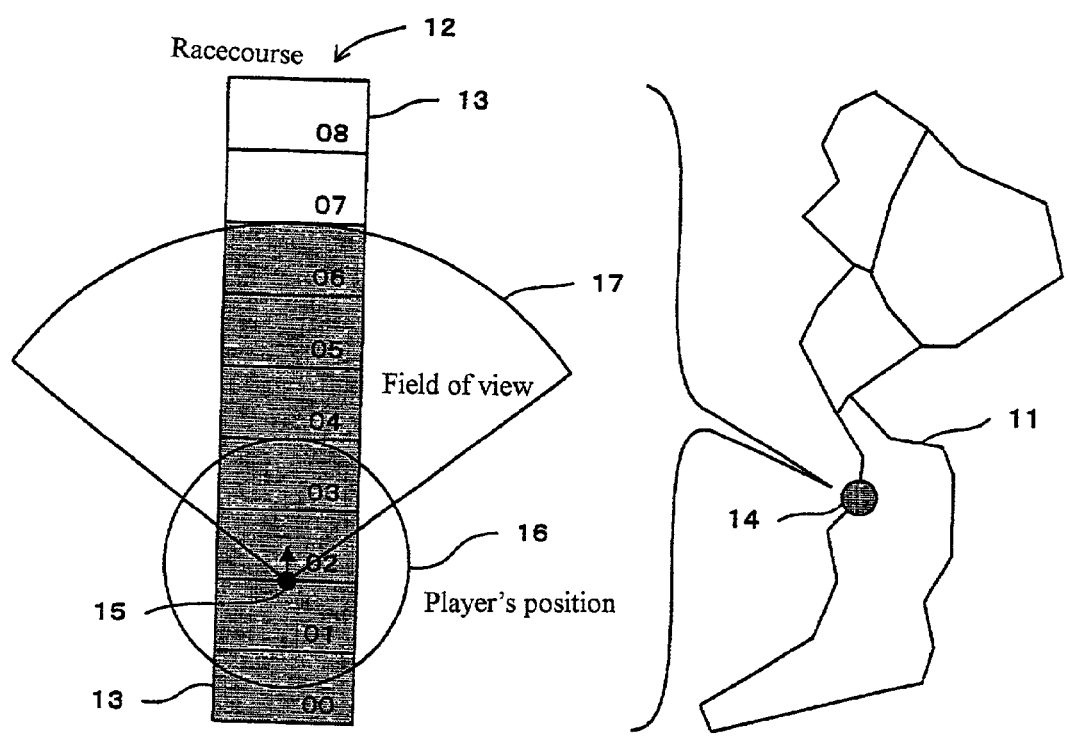
FIG. 1 is an explanatory diagram showing the consecutive reading method of the present invention and an overhead view of a racecourse.

FIG. 1 shows an explanatory diagram for the consecutive reading method of the present invention and an overhead view of a racecourse used in the game. A racecourse 11 for the car racing game includes a black dot that indicates a graphical region 14 around the player's position on the course. A course data 12 includes a segment table 13 formed of data segments 00 through 08, in this example. The segment table 13 also includes field data for the graphical region 14 in the racecourse. A player's position 15 is indicated in the segment table 13. The arrow from the player's position 15 represents the direction of player movement. In the segment table 13, seven data segments 00 through 06 have been shaded. These shaded data segments represent the portion of data that has already been read from the CD-ROM or other storage device and currently resides in the memory of the game console. Segments 07 and 08, which have not been shaded, represent course data for the segment table 13 that is to be read next. The course data 12 also indicates the player's field of view 17 and the player's range of action 16.

Based on the player's progress during the race, required data in the course data 12 is read one segment at a time from the storage device into memory while unnecessary data is discarded. In this example, data for the segments 00 through 06 have already been read into memory from the CD-ROM or other storage device. If the player's position shifts to segment 03, data for segment 00 is cleared from the memory and data for segment 07 is read from the storage device. Accordingly, the course can be as long as desired, providing all the course data can fit in the storage device.

In the game of the present embodiment, one segment represents 50 m. Approximately, 2,000 segments are used in the game. However, the total length of the course is approximately 180 km since some parts of the course overlap and contain shared data.

Figure 2:
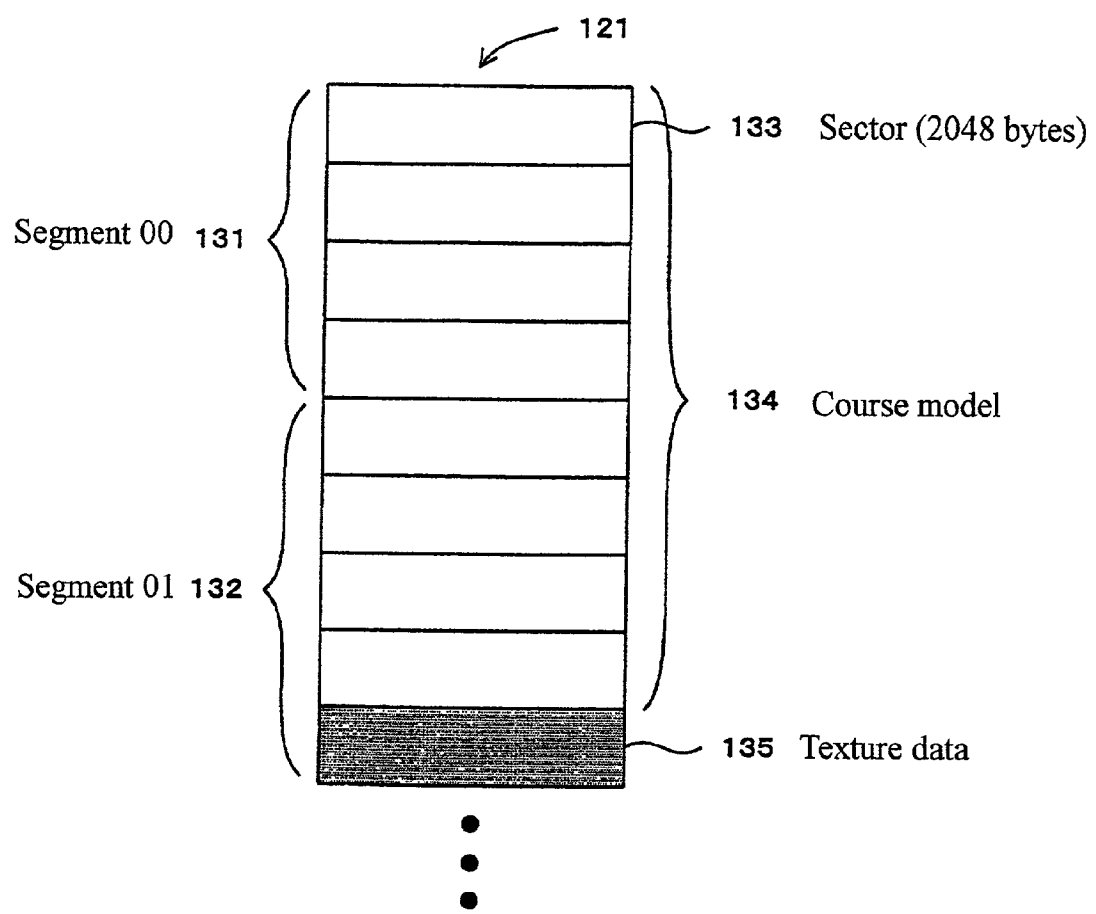
FIG. 2 is an explanatory diagram showing the format for storing data in memory according to the present invention.

FIG. 2 shows a memory map indicating the format in which data is stored in memory for the consecutive reading method according to the present embodiment. Data for the racecourse is read into the memory of the game console from the CD-ROM or other storage device in units of segments. As shown in FIG. 2, a course data 121 currently resides in the memory of the game console. The course data 121 comprises a plurality of segments including a segment 00 131 and a segment 01 132. Each segment further comprises a plurality of sectors 133 having 2048 bytes of data each.

The most important elements of the segments are a course model data 134 and a texture data 135. The model data 134 includes data for surrounding scenery that changes according to the player's progress in the race. The texture data 135 includes data on speed limits for bridges, tunnels, and curves and other road signs, which data is associated with the scenery data, and data accompanying graphical data for controlling the racecars and the like. Some segments contain only the model data 134, while others contain both the model data 134 and the texture data 135. In addition to the components, the size of the segments is also not fixed.

Course data written to the storage device is divided into segments of the maximum size that can be read with one random access. This method is used to prevent data reads required during the race from halting movement of the racecars.

Whether or not to display certain course data during a race is determined based on a model number corresponding to the racecourse (graphical region), the start position of the sector in memory, the length of the sector, the center position in the course model (graphical model), and the radius of the course model. This data is saved in a separate table in memory and updated based on the player's movements and progress on the racecourse.

At this time, course data to be displayed in the player's field of view from the player's current position on the racecourse to the point of observation is sorted in order from the point of observation. Display requests for areas exceeding a predetermined number of buffers are discarded at this time. Of course, it is also possible to allow adjustments in the number of buffers in order to support game consoles with higher memory capacity or hardware having a large display capacity.

When a read from memory fails for any reason, the portion of data that was not read is not displayed. Priority is placed on reading data that must be displayed currently or on data that must be read into memory. If a second request is issued for displaying this data, the order of priority is adjusted based on the results of sorting the data in order from the point of observation.

Hence, the decision to display or not to display data in the present invention is performed based on effective use of data and appropriateness of the memory, while conventional methods simply determine what to display from the center position of the course model data to the point of observation.

During this process, data is read into free areas of memory. However, after repeatedly clearing unneeded data and reading in new data, the memory becomes fragmented, making memory use inefficient. At some point, the amount of available memory will become insufficient because a large enough area of consecutive memory cannot be allocated. For this reason, it is necessary to perform garbage collection in which unused gaps between data are eliminated and the recovered memory collected to allocate larger consecutive regions in memory. The determination to perform garbage collection is made based both on tables used when determining whether or not to display data and on display requests. The garbage collection is performed at suitable times to avoid interruptions in the flow of the game.

Figure 3:
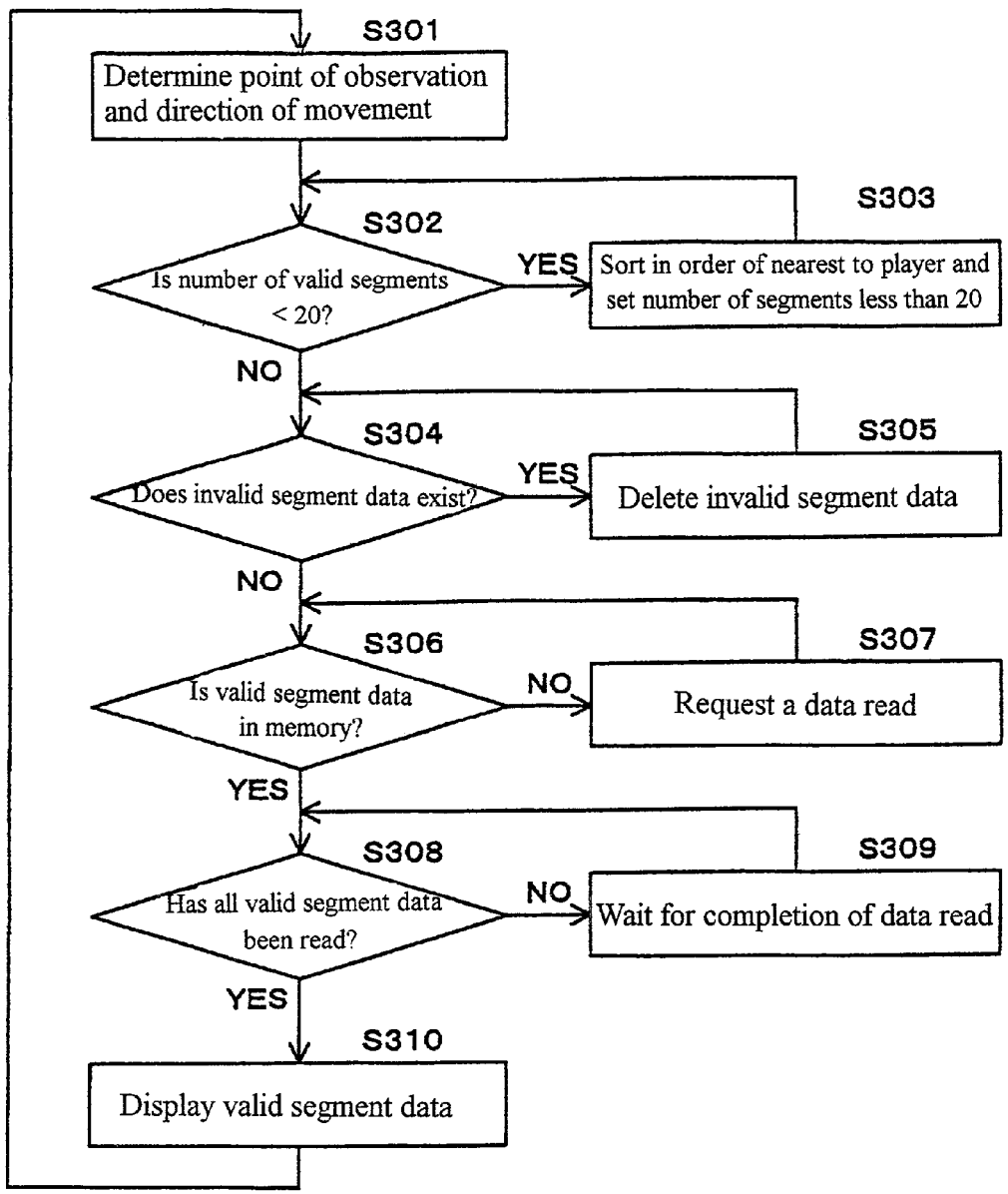
FIG. 3 is a flowchart showing the consecutive reading method of the present invention.

FIG. 3 is a flowchart showing the consecutive reading method for a computer game according to the present embodiment. The process of the flowchart includes setting the number of valid segments displayed for the racecourse to less than 20 and to read course data into memory and delete data therefrom.

When the game program reads course data for the racecourse, the program determines the player's point of observation and direction of movement in S301. In S302, the program determines whether the number of valid segments required for the display is less than 20. If the number is less than 20 (Yes in S302), the course data is sorted in order from the position nearest the player, and the number of segments in memory still keeps a number less than 20 in S303.

If the number of valid segments is 20 or greater (No in S302), then the program determines in S304 whether invalid segment data exists. If invalid segment data exists (Yes in S304), then the invalid segment data is deleted in S305.

If invalid segment data does not exist (No in S304), then the program determines in S306 whether valid segment data exists in memory. If valid segment data does not exist in memory (No in S306), then a data read request is issued in S307.

If valid segment data exists in memory (Yes in S306), then the program determines in S308 whether all valid segment data has been read. If all valid segment data has not been read (No in S308), then the process waits for data to be read in S309.

If all valid segment data has been read (Yes in S308), then the valid segment data is displayed in S310. Subsequently, the program again determines the player's point of observation and direction of movement in S301. This process is repeated to read course data into memory and delete course data from memory.

Since the consecutive reading method of the embodiment described above reads new data segments into memory and deletes unnecessary data segments from memory, a new screen can be displayed for a long continuous racecourse. This method is more attractive to users not only of racing games, but for any game that provides constantly new scenery.

Since the field data contains both graphics and texture data, more complex scenery can be depicted. In the car racing game example, speed limits and road signs for bridges, tunnels, and curves can be associated with the scenery to bring out the feeling of an actual race. Further, by reading field data in units equivalent to the maximum size that can be read in one random access, it is possible to load the maximum amount of graphics data without interrupting the game. By configuring segments of sector units, graphics data can be read at an optimal access rate.

Further, the consecutive reading method of the present invention uses memory effectively by determining what field data to display based on data required for the player's progress, rather than simply examining data up to the player's point of observation.

What is claimed is:

1. A consecutive reading method for a computer game for reading field data from a storage device into a memory in a computer, the method comprising the steps of:

reading as a plurality of segments the field data to be resident in the memory and displayed on a monitor screen;

deleting some of the plurality of segment field data selected based on the player's position from the segments of field data resident in the memory in response to the player's position and reading new segment field data selected based on the player's position into the memory to replace the deleted plurality of the segment field data such that some of the plurality of segments of field data remain in the memory.

2. The consecutive reading method for a computer game as recited in claim 1, wherein the field data comprises:
   graphics data to be displayed on the monitor screen; and
   texture data accompanying the graphics data.

3. The consecutive reading method for a computer game as recited in claim 1, wherein the field data is divided into units of a maximum size that can be read in one random access.

4. The consecutive reading method for a computer game as recited in claim 1, wherein the segments comprise sector units equivalent to the smallest unit that can be read from the storage device.

5. A consecutive reading method for a computer game as recited in claim 1, further comprising the step of determining whether or not to display the field data by referencing a table stored in memory, the table comprising such data as the model number corresponding to the graphics region, the starting position of the sector in memory, the sector length, the center position of the graphics model, and the radius of the graphics model.

6. A consecutive reading method for a computer game as recited in claim 1, further comprising the steps of:
   predetermining a number of buffers for storing field data;
   sorting field data to be displayed in the player's field of view in order from the point of observation; and
   discarding requests for displaying field data when the number of field data exceed the number of buffers.

7. The recording medium for storing computer programs using the consecutive reading method recited in claim 1 and data read by the computer programs.

8. The consecutive reading method of claim 1, wherein the player's position is based upon the segment.

9. The consecutive reading method for a computer game as recited in claim 8, further comprising the step of determining whether or not to display the field data by referencing a table stored in memory, the table comprising such data as the model number corresponding to the graphics region, the starting position of the sector in memory, the sector length, the center position of the graphics model, and the radius of the graphics model.

10. The consecutive reading method of claim 1, wherein the deleted segment field data is unnecessary any data.

* * * * *